US006965901B2

(12) United States Patent
Eastham

(10) Patent No.: US 6,965,901 B2
(45) Date of Patent: Nov. 15, 2005

(54) ADAPTIVE AND GENERALIZED STATUS MONITOR

(75) Inventor: Paul Eastham, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 245 days.

(21) Appl. No.: 10/236,074

(22) Filed: Sep. 5, 2002

(65) Prior Publication Data
US 2003/0046271 A1 Mar. 6, 2003

Related U.S. Application Data

(63) Continuation of application No. 09/307,089, filed on May 7, 1999, now Pat. No. 6,457,015.

(51) Int. Cl.[7] .............................................. G06F 17/30
(52) U.S. Cl. ........................................ 707/102; 707/2
(58) Field of Search ............................ 707/100–104.3, 707/1–3.1; 709/224, 236, 204; 706/12, 48; 345/501

(56) References Cited

U.S. PATENT DOCUMENTS

| 3,893,024 A | | 7/1975 | Reines et al. | |
|---|---|---|---|---|
| 4,937,763 A | | 6/1990 | Mott | |
| 5,018,144 A | | 5/1991 | Corr et al. | |
| 5,107,500 A | | 4/1992 | Wakamoto et al. | |
| 5,109,350 A | | 4/1992 | Henwood et al. | |
| 5,261,051 A | * | 11/1993 | Masden et al. | 711/152 |
| 5,377,196 A | | 12/1994 | Godlew et al. | |
| 5,463,642 A | | 10/1995 | Gibbs et al. | |
| 5,621,663 A | | 4/1997 | Skagerling | |
| 5,627,766 A | | 5/1997 | Beaven | |
| 5,627,842 A | | 5/1997 | Brown et al. | |
| 5,628,004 A | * | 5/1997 | Gormley et al. | 707/104.1 |
| 5,633,999 A | * | 5/1997 | Clowes et al. | 714/6 |
| 5,664,107 A | * | 9/1997 | Chatwani et al. | 709/224 |
| 5,696,486 A | | 12/1997 | Poliquin et al. | |
| 5,704,036 A | | 12/1997 | Brownmiller et al. | |
| 5,729,685 A | * | 3/1998 | Chatwani et al. | 709/224 |
| 5,745,669 A | | 4/1998 | Hugard et al. | |
| 5,787,409 A | | 7/1998 | Seiffert et al. | |
| 5,875,444 A | | 2/1999 | Hughes | |
| 6,054,928 A | | 4/2000 | Lemelson et al. | |
| 6,072,777 A | | 6/2000 | Bencheck et al. | |
| 6,073,089 A | | 6/2000 | Baker et al. | |

(Continued)

FOREIGN PATENT DOCUMENTS

EP          0308056 A2 *  3/1989   ........... G06F 15/16

(Continued)

OTHER PUBLICATIONS

Wybranietz et al., "Joint international conference on measurement and modeling of computer system", 1998, pp. 197-206.*

(Continued)

Primary Examiner—Mohammad Ali
(74) Attorney, Agent, or Firm—Swernofsky Law Group PC

(57) ABSTRACT

The invention provides a method and system for monitoring status in a relatively continuous consistent and intelligent manner. A status monitor receives monitoring data, and adaptively and dynamically associates those known combinations with assessments of the monitored devices, systems, or networks. From an initial set of selected knowledge (or even no knowledge at all), the status monitor develops a database of information regarding anomalous conditions, and measurements of likely causes and faults and learns which of those anomalous conditions require response. Appropriate responses can include informing a system operator, taking remedial action, and altering or terminating the monitored device, systems or network.

21 Claims, 3 Drawing Sheets

U.S. PATENT DOCUMENTS

| | | |
|---|---|---|
| 6,192,403 B1 | 2/2001 | Jong et al. |
| 6,295,611 B1 | 9/2001 | Connor et al. |
| 6,327,677 B1 | 12/2001 | Garg et al. |
| 6,405,327 B1 | 6/2002 | Sipple et al. |

FOREIGN PATENT DOCUMENTS

| | | | | |
|---|---|---|---|---|
| EP | 0410630 A | * | 1/1991 | ........... G06F 11/14 |
| EP | 0306244 A2 | * | 3/1993 | ........... G06F 11/00 |
| EP | 0566967 A | * | 10/1993 | ........... G06F 11/14 |
| EP | 0760503 A1 | * | 3/1997 | ........... G06F 11/14 |
| WO | WO 00/68795 A1 | | 11/2000 | |

OTHER PUBLICATIONS

Borr A J: "SecureShare: safe Unix/Windows file sharing through multiprotocol locking" Proceeding of the 2$^{nd}$ Usenix Windows NT Symposiom, proceedings of 2$^{nd}$ Usenix Windows NT Symposiom, Seattle, WA, USA, Aug. 3-5, 1998, pp. 117-126.*

XP002097387 ISBN 1-880446-95-2, 1998, Berkeley, CA, USA, Usenix Associ. USA.*

D. Wybranietz and D. Haban. "Monitoring and performance measuring distributed systems during operation". ACM Sigmetrics Conference, 1988, pp. 197-206.

* cited by examiner

ADAPTIVE AND GENERALIZED STATUS MONITOR

CROSS REFERENCE TO RELATED APPLICATIONS

This application is a continuation of application Ser. No. 09/307,089, filed May 7, 1999, now U.S. Pat. No. 6,457,015. This application is also related to PCT application Serial Number PCT/US00/12491 filed May 5, 2000.

BACKGROUND OF THE INVENTION

1. Field of the Invention

The invention relates to status monitors, including those for adaptively monitoring status information from multiple sources such as file servers and system administrators.

2. Related Art

Monitoring devices collect and present monitoring information, such as information regarding operation of a device, system, or network. The monitoring information is sometimes used to determine or respond to faults in the monitored devices, systems, or networks.

One problem in the known art is that of recognizing and responding to anomalous behavior on the part of the monitored devices, systems, or networks. Because the monitored devices, systems, or networks can be complex, it is difficult or impossible to anticipate all, or even most, of the possible ways in which anomalous behavior can occur. Even if it were possible to anticipate anomalous behaviors, it is difficult or impossible to anticipate how those anomalous behaviors would manifest themselves in the available data.

A first known method is to present a visual display of status information, and to rely on a human operator to determine whether the behavior of the monitored devices, systems, or networks are anomalous, and if so, to determine what that anomalous behavior indicates about possible errors or faults in operation. While this method can achieve the purpose of recognizing and responding to anomalous behaviors, it has the drawback of requiring constant and consistent attention of a human being relatively skilled in the operation of the monitored devices, systems, or networks. This drawback is exacerbated when there are a relatively large number of monitored devices, systems, or networks or when the monitored devices, systems or networks are complex. Moreover, this known method is also subject to the drawback that it is limited to those aspects of behavior that are predetermined for presentation to the human being.

A second known method is to present information, as in the first method, to an expert system or other software designed for recognizing and responding to anomalous behavior. While this known method has the advantage of not requiring the constant and consistent attention of a human being, it suffers from the drawback that it is limited by the skill predetermined for inclusion in the expert system or other software. As with the first known method, this method is also subject to the drawback that it is limited to those aspects of behavior that are predetermined for presentation (to the expert system). Moreover, this method is also subject to the drawback that it can erroneously determine and respond to anomalous conditions that are not in fact faults, without substantial opportunity to learn.

Accordingly, it would be desirable to provide a method and system for monitoring status in a relatively continuous, consistent, and intelligent manner. This method is achieved in an embodiment of the invention in which a status monitor receives monitoring data, adaptively and dynamically builds a database of known combinations of monitoring data, and adaptively and dynamically associates those known combinations with assessments of the monitored devices, systems, or networks. From an initial set of selected knowledge that is limited (even limited to no knowledge at all), the status monitor can learn those anomalous conditions that require response and what responses are appropriate.

SUMMARY OF THE INVENTION

The invention provides a method and system for monitoring status in a relatively continuous, consistent, and intelligent manner. A status monitor receives monitoring data, adaptively and dynamically builds a database of known combinations of monitoring data, and adaptively and dynamically associates those known combinations with assessments of the monitored devices, systems, or networks. From an initial set of selected knowledge that is limited (even limited to no knowledge at all), the status monitor learns those anomalous conditions that require response and what responses are appropriate. The status monitor develops a database of information regarding distinguishable conditions, and measurements of the likely causes or effects of recognizable errors or faults. When an anomalous pattern is recognized, the status monitor, responsive to the anomalous pattern, diagnoses and corrects, or informs a human operator regarding, the monitored devices, systems, or network.

In a preferred embodiment, the monitoring data includes a set of data streams each possibly having a different format, and each selectively interpreted so as to present information to the status monitor in a format usable by the status monitor. New data streams and formats can be dynamically added or altered. Appropriate responses can include informing human beings; taking remedial action for the monitored devices, systems, or networks; or altering or terminating the operation of the monitored devices, systems, or networks.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

System Elements

Figure 1:
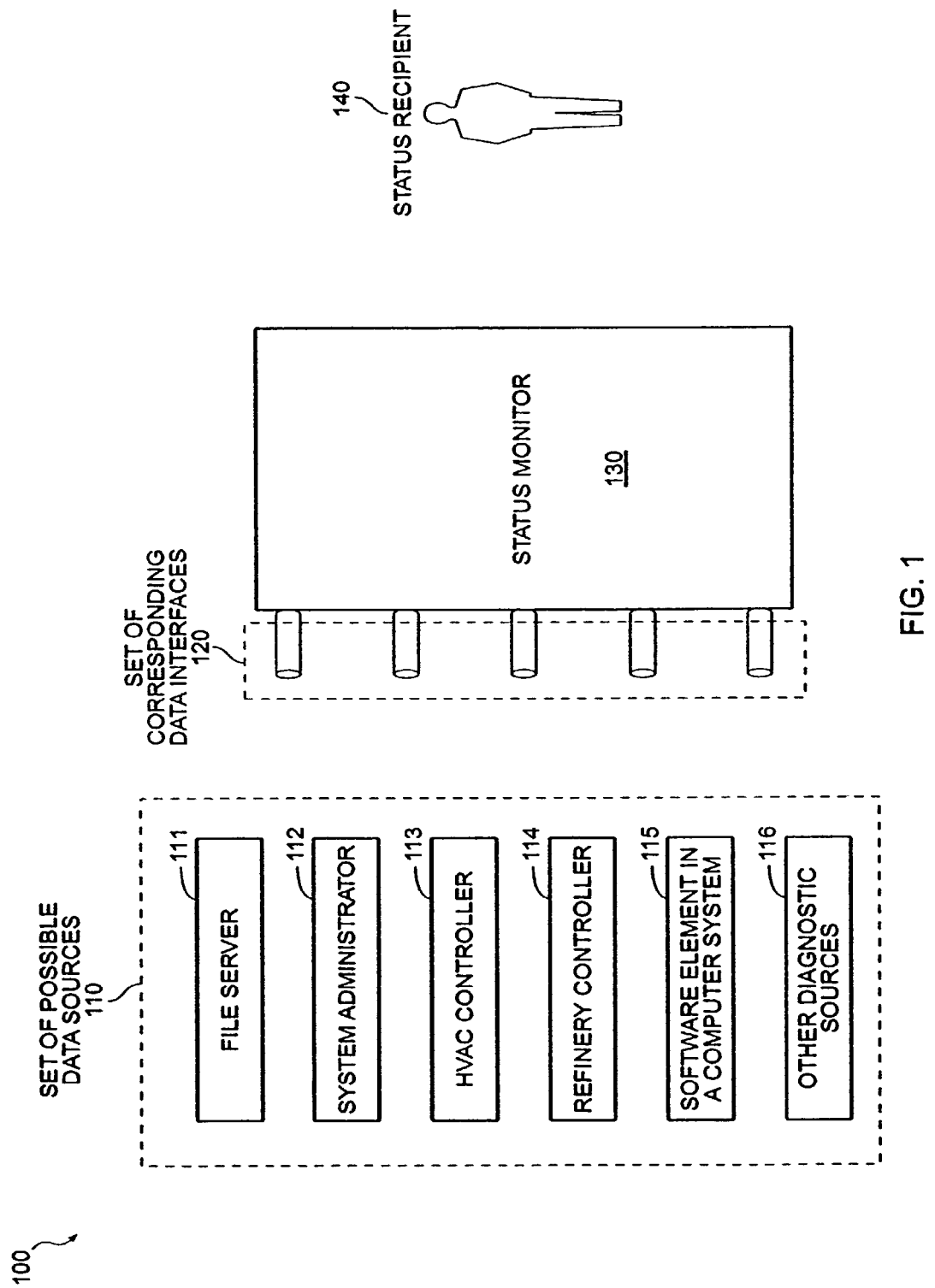
FIG. 1 shows a block diagram of a system including a status monitor for adaptively monitoring status information from multiple sources.

FIG. 1 shows a block diagram of a system including a status monitor for adaptively monitoring status information from multiple sources.

A system 100 includes a set of data sources 110, a set of corresponding data interfaces 120, a status monitor 130, and a status recipient 140.

The data sources 110 can include differing types of data sources 110 for which monitoring is appropriate, including a file server 111 or other type of server, a system administrator 112 or other operator, an HVAV controller 113, a refinery; controller 114, a software element in a computer system 115 or other diagnostic sources 116. The differing types of data sources 110 can generate data in differing formats. For example, the file server 111 or other type of server can generate data in SNMP format; the system administrator 112 or other operator can generate data using an email program, and the other diagnostic sources 116 can generate data in other formats. SNMP format and email formats are known in the art of network communication.

In a preferred embodiment, the data sources 110 use a communication network to send information to the data interfaces 120. The communication network can include any known apparatus and methods for sending information from the data sources 110 to the data interfaces 120. Those skilled in the art would recognize, after perusal of this application, that any such apparatus and methods would be within the scope and spirit of the invention. In a preferred embodiment, the communication network includes a LAN (local area network), WAN (wide area network), an internet, intranet, extranet, VPN (virtual private network), or some combination thereof.

The data interfaces 120 each correspond to one of the data sources 110. Each data interface 120 receives data from its corresponding data source 110, and forwards that data to the status monitor 130 in a format usable by the status monitor 130. Additional data interfaces can be added, if desired. In a preferred embodiment, each data interface 120 is disposed for recognizing and parsing the format of its corresponding data source 110, and for generating messages in a single format usable by the status monitor 130. Moreover, data interfaces may completely encapsulate all knowledge of the format and the language of the data source.

The status monitor 130 includes a processor, program and data memory, and can include mass storage. Construction and use of devices including processors, program and data memory, and mass storage are known in the art of computer programming.

The status monitor 130 need not be a separate physical device. It can be embodied in a software element in a device also used for other purposes, and can be physically co-located with the status recipient 140. In a preferred embodiment, software elements of the status monitor 130 operate as an application program under control of an operating system on the processor with program and data memory. The application program can include software derived from source code compiled or interpreted from a Perl script or one or more programming languages such as the C++ programming language. Both the Perl scripting language and the C++ programming language are known in the art of computer programming.

The status monitor 130 receives messages from the data interfaces 120, and is disposed for processing those messages to recognize fault conditions and to determine the nature of the fault with which the fault conditions are correlated.

As used herein, the term "fault" and the phrase "fault condition" refer to conditions of interest to operators of the system 110, such as human operators or control programs. There is no particular requirement in the invention that a fault or fault condition refer to an actual error or failure in operation of the system 100 or one of its parts.

When recognizing fault conditions and determining the nature of the correlated faults, the status monitor 130 sends a message to the status recipient 140 indicating the fault conditions and the faults.

The status recipient 140 can include an operator of the system 110, such as a human operator or a control program, a log file, or a communication link for distributing messages regarding the fault conditions and the faults.

The status recipient 140 can include a workstation for use by the operator of the system 110, logically remote from the device 111, which can be physically relatively local or physically relatively remote. In a preferred embodiment, the system can include more than one such device 111 being monitored, and more than one such status recipient 140 disposed for receiving monitoring information.

The workstation for the status recipient can include a monitoring and analysis program, including a graphical user interface and a set of commands for analyzing and presenting data.

Status Monitor Elements

Figure 2:
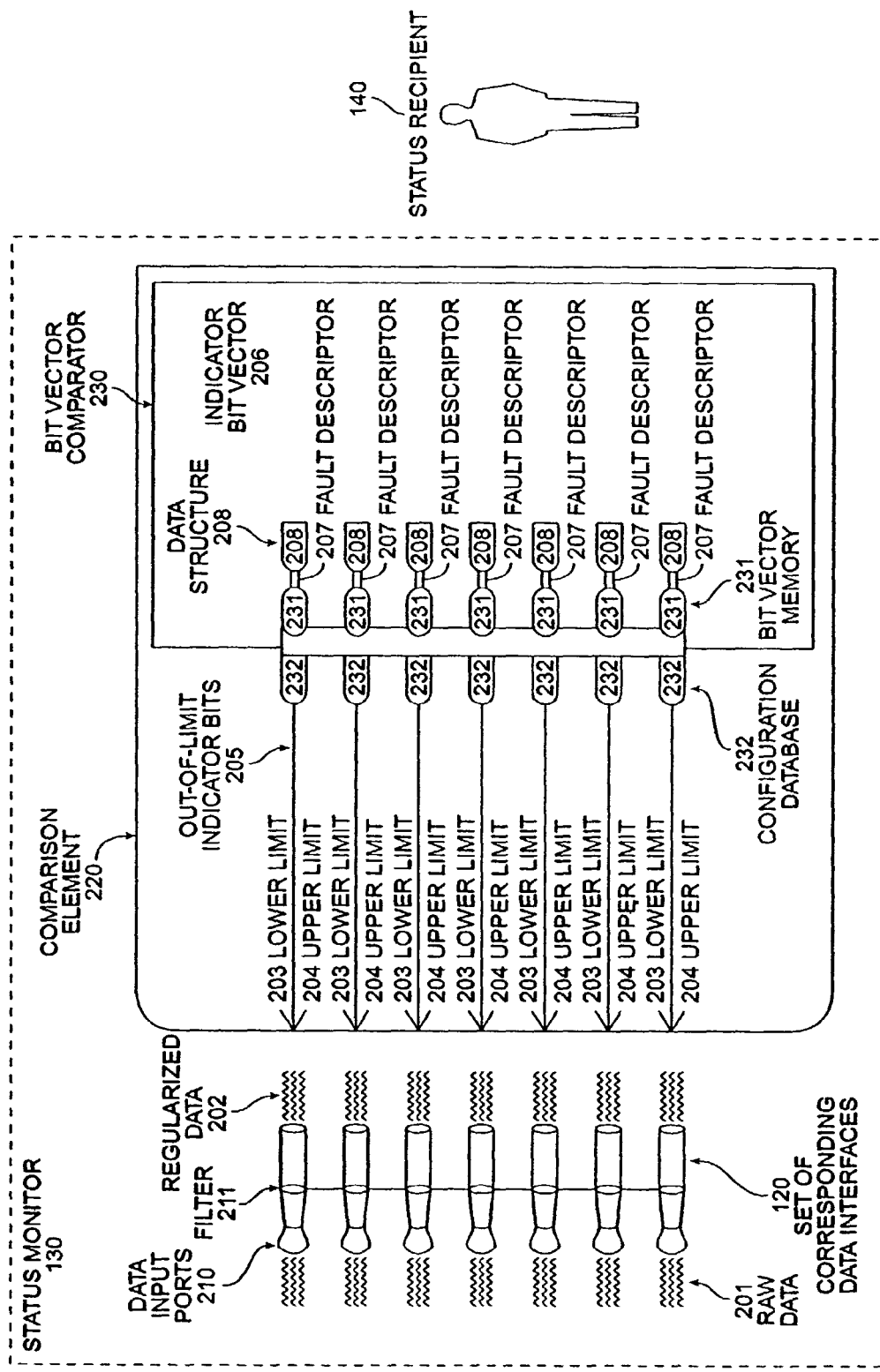
FIG. 2 shows a block diagram of a status monitor for adaptively monitoring status information from multiple sources.

FIG. 2 shows a block diagram of a status monitor for adaptively monitoring status information from multiple sources.

The status monitor 130 includes multiple data input ports 210, each of which is associated with a corresponding data interface 120 and a corresponding filter 211. Each input port 210 receives messages indicating values for raw data 201 from its corresponding data interface 120. Each input port 210 processes the raw data 201 to provide regularized data 202, and sends the regularized data 202 to a corresponding comparison element 220.

As used herein, the phrase "regularized data" 202 refers only to a form of the raw data 201 after the input port 210 has processed it. There is no particular requirement that the regularized data 202 must follow some known distribution, although it is expected that many items of raw data 201 will have known random distributions such as a normal, binomial, poisson, or equiprobable distributions.

In a preferred embodiment, the input ports 210 may regularize the raw data 201 by determining a trend. The input ports 210 can determine a trend using any one of a number of known techniques, including for example relative time change in the raw data 201. In alternative embodiments, the input ports 210 can regularize the raw data 201 by determining other statistical measures, such as confidence values or correlation values.

The comparison elements 220 each receive the regularized data 202, and determine if the received values for the regularized data 202 are outside of a selected limit range, designated by a selected lower limit value 203 and a selected upper limit value 204. Each comparison elements 220 provides a corresponding out-of-limit indicator bit 205 indicating whether or not the regularized data 202 is within the selected limit range.

The indicator bits 205 from the comparison elements 220 are collected into an indicator bit vector 206. The indicator bit vector 206 is coupled to a bit vector comparator 230.

The bit vector comparator 230 includes a bit vector memory 231, which itself includes a set of selected bit vectors 206, each associated with a fault descriptor 207. The fault descriptor 207 indicates information about a fault associated with its corresponding bit vector 206.

In a preferred embodiment, the number of bit vectors 206 in the bit vector memory 231 can be selected by a system administrator 112 or other operator, and is preferably at least about 32.

In a preferred embodiment, the fault descriptor 207 includes a pointer to a data structure 208 that includes further information about the fault. This further information can include one or more of, or some combination of, the following:

- an assessment of the fault, such as a numeric degree of seriousness;
- a description of the fault, such as a title or text description;

or

- a set of actions to be taken in response to the fault, such as a set of individuals to inform about the fault (whether by email, pager, or other technique), a set of functions for the system 100 that should be suspended in response to the fault, or other appropriate actions.

The bit vector comparator 230 receives the indicator bit vector 206 and compares it against the selected bit vectors 206 in the bit vector memory 231. The bit vector comparator 230 selects one or more matching selected bit vectors 206 and provides, in response to associated fault descriptors 207, one or more outputs.

In a preferred embodiment, the bit vector comparator 230 selects the "best match" among the selected bit vectors 206 in the bit vector memory 231 for the indicator bit vector 206, and provides one output in response to the corresponding fault descriptor 207. The bit vector comparator 230 sends the indicator bit vector 206 and the corresponding fault descriptor 207 to the status recipient 140, and takes other appropriate action as indicated by the fault descriptor 207.

In a preferred embodiment, at least one (and possibly several) of the selected bit vectors 206 in the bit vector memory 231 has an associated fault descriptor 207 that describes a "normal" or non-fault condition. Thus, the bit vector comparator 230 can select, in response to the input bit vector 206, an associated "normal" fault descriptor 207. Thus, some anomalous bit vectors 206 can be associated with known lack of error.

In a preferred embodiment, the "normal" fault descriptor 207 can be selected to indicate that all is well with the system 100 and that no action is required. Moreover, the "normal" fault descriptor 207 (and other fault descriptor 207 deemed insufficiently serious) can be set so that no action is taken in response thereto, including sending no message to the status recipient 140.

In a preferred embodiment, the selected techniques or values used by the system 100 can be included in a configuration database 132 associated with the status monitor 130 and alterable by the system administrator 112 or other operator. The configuration database 132 can include one or more of, or any combination of, any of the following:

- The technique(s) used by each data interface 120 to reformat the data from the data sources 110. For example, data interfaces 120 disposed for receiving SNMP messages can be configured to recognize and extract data from those messages. Data interfaces 120 disposed for receiving email or other text can be configured to recognize text in response to selected keywords and to asses that text in response thereto.
- The technique(s) used by each input port 210 to determine trends.
- Known associations between selected bit vector patterns and selected faults or other events.

In a preferred embodiment, the configuration database 132 can include a set of possible anomalies that might be associated with the functional status of the device 111 and an set of associations between those anomalies and a set of selected fault conditions.

Method of Operation

Figure 3:
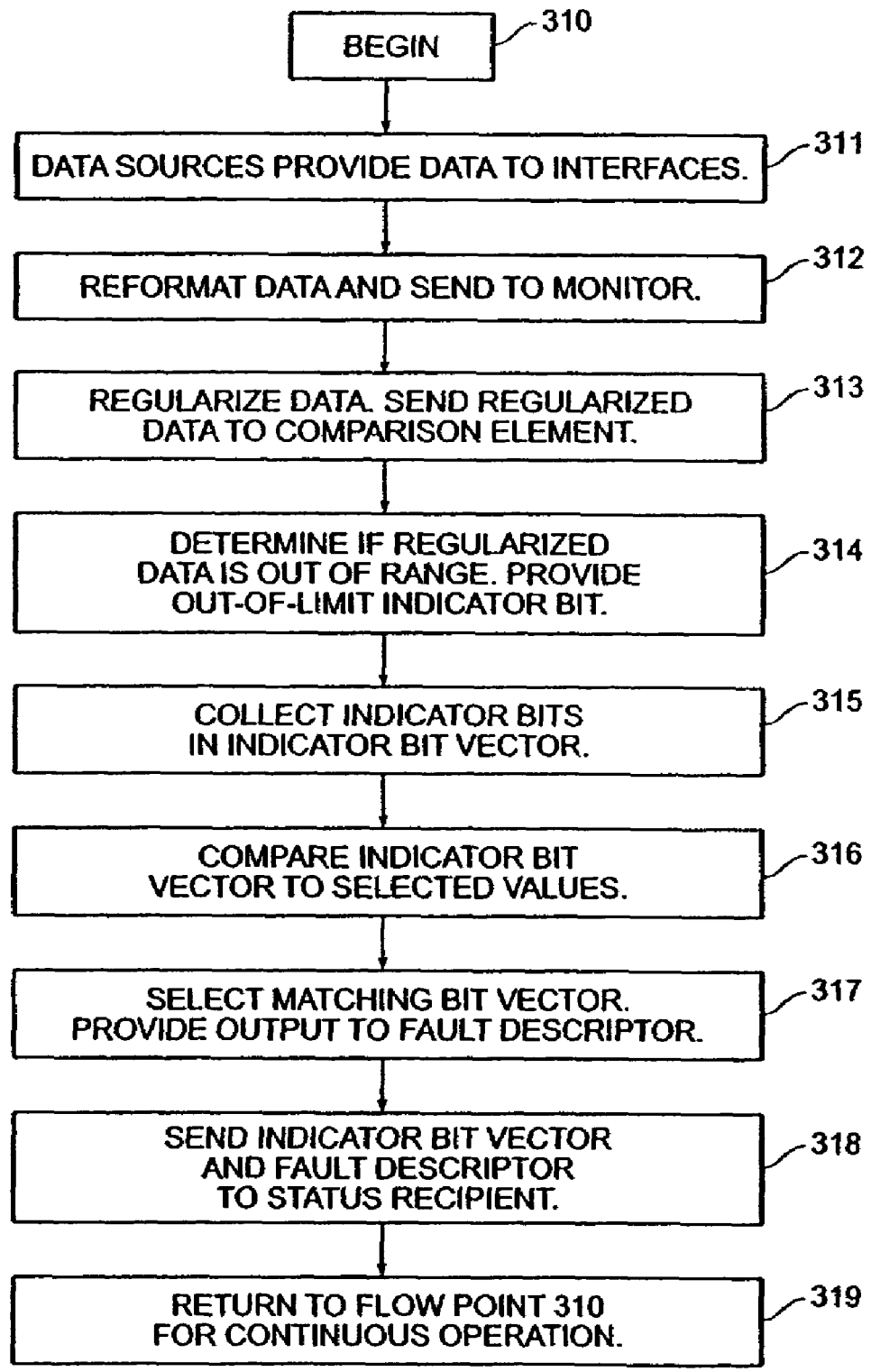
FIG. 3 shows a process flow diagram of a method of operation for a status monitor for adaptively monitoring status information from multiple sources.

FIG. 3 shows a process flow diagram of a method of operation for a status monitor for adaptively monitoring status information from multiple sources.

A method 300 is performed by the system 100 operating in conjunction, including the data sources 110, data interfaces 120, and the status monitor 130.

At a flow point 310, the system 100 is in operation and the method 300 is being continuously performed.

At a step 311, the data sources 110 provide data to the data interfaces 120. In a preferred embodiment, the data sources 110 provide data by sending messages to the data interfaces 120 in known formats, as described above.

At a step 312, each data interface 120 can receive data from its corresponding data source 110. For each data interface 120 that receives data, the data interface 120 (a) receives the data, (b) reformats the data if necessary into a the format usable by the status monitor 130, and (c) sends the reformatted data to the status monitor 130 in that usable format.

At a step 313, the input ports 210 of the status monitor 130 can each receive a set of values for raw data 201. For each input port 210 that receives raw data 201, the input port 210 (a) receives the raw data 201, (b) processes the raw data 201 to provide regularized data 202, and (c) sends the regularized data 202 to its corresponding comparison element 220 in the status monitor 130.

As part of this step, each input port 210 that receives raw data 201 can determine a trend for that raw data 201, as described above.

At a step 314, the comparison elements 220 in the status monitor 130 can each receive a set of values for the regularized data 202. For each comparison element 220 that receives regularized data 202, the comparison element 220 (a) receives the regularized data 202, and (b) processes the regularized data 202 to determine if the received values for the regularized data 202 are outside of a selected limit range, as described above. In response to this processing, the comparison element 220 provides a corresponding out-of-limit indicator bit 205 indicating whether or not the regularized data 202 is within the selected limit range.

At a step 315, the indicator bits 205 from the comparison elements 220 are collected into an indicator bit vector 206. The indicator bit vector 206 is coupled to a bit vector comparator 230.

At a step 316, the bit vector comparator 230 receives the indicator bit vector 206 and compares it against the selected bit vectors 206 in the bit vector memory 231.

At a step 317, in response to the comparison in the previous step, the bit vector comparator 230 selects one or more matching selected bit vectors 206 and provides, in response to fault descriptors 207 associated with those matching selected bit vectors 206, one or more outputs. In a preferred embodiment, the bit vector comparator 230 selects one "best match" among the selected bit vectors 206 in the bit vector memory 231 for the indicator bit vector 206, and provides one output in response to the corresponding fault descriptor 207, as described above.

At a step 318, in response to the fault descriptors 207 determined in the previous step, the bit vector comparator 230 sends the indicator bit vector 206 and the corresponding fault descriptor 207 to the status recipient 140, and takes other appropriate action as indicated by the fault descriptor 207.

The method 300 operates continuously, and so returns to the flow point 310.

In a preferred embodiment, the system 100 starts with substantially no information in the bit vector memory 231, and so spends an amount of time in a learning phase. During the learning phase, the status monitor 130 determines that indicator bit vectors 206 that do not well match any of the selected bit vectors 206 in the bit vector memory 231 are new bit vectors 206, and adds those new bit vectors 206 to the bit vector memory 231.

When recognizing a new bit vector 206, the status monitor 130 can send a message to the status recipient 140 requesting information to associate in the fault descriptor 207 for that new bit vector 206.

When recognizing a new bit vector 206, the status monitor 130 can also adaptively respond to other information available at the time the new bit vector 206 is received, including one or more of, or any combination of, any of the following:

Selected patterns can be associated with keywords or other aspects (such as priority) of email received from selected users.

Selected anomalous patterns can be associated with normal activity. For example, period of low network activity in the absence of other factors may be associated with off-peak hours.

Selected anomalous patterns can be associated with specific defects based upon past history.

or

Selected anomalous patterns can be associated with preset data that is included in the configuration database 132.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A memory storing information including instructions, the instructions executable by a processor, the instructions including
receiving monitoring data, wherein said monitoring data is received from and pertains to at least one of the following: (i) a file server; or (ii) a software element in a computer system;
generating indicator bits, wherein each of said indicator bits is responsive to data in said monitoring data that falls outside a limit;
collecting said indicator bits in a bit vector comparator,
in response to said indicator bits, adaptively and dynamically building a database of known combinations of said monitoring data, wherein said database is coupled to a bit vector comparator;
in response to said monitoring data, adaptively and dynamically building a database of associations between said known combinations and selected monitoring assessments; and
taking action in response to said selected monitoring assessments.

2. A memory as in claim 1, wherein said database includes a non-null initial set of said known combinations.

3. A memory as in claim 1, wherein said database includes a null initial set of said known combinations.

4. A memory as in claim 1, wherein said database includes at least one said known combination associated with a non-fault monitoring assessment.

5. A memory as in claim 1, wherein said monitoring data includes SNMP data or email text.

6. A memory as in claim 1, wherein said selected monitoring assessments include at least one of
diagnostic information of a fault;
message information for presentation to an operator; or
remedial action to be taken in response to said selected monitoring assessments.

7. A memory as in claim 1, wherein said instructions of receiving monitoring data include instructions of receiving selected monitoring data having a new data format.

8. An apparatus, including a processor, and a memory, said memory storing instructions of
receiving monitoring data, wherein said monitoring data is received from and pertains to at least one of the following: (i) a file server; or (ii) a software element in a computer system;
generating indicator bits, wherein each of said indicator bits is responsive to data in said monitoring data that falls outside a limit;
collecting said indicator bits in a bit vector comparator,
in response to said indicator bits, adaptively and dynamically building a database of known combinations of said monitoring data, wherein said database is coupled to a bit vector comparator;
in response to said monitoring data, adaptively and dynamically building a database of associations between said known combinations and selected monitoring assessments; and
taking action in response to said selected monitoring assessments.

9. An apparatus as in claim 8, wherein said database includes a non-null initial set of said known combinations.

10. An apparatus as in claim 8, wherein said database includes a null initial set of said known combinations.

11. An apparatus as in claim 8, wherein said database includes at least one said known combination associated with a non-fault monitoring assessment.

12. An apparatus as in claim 8, wherein said monitoring data includes SNMP data or email text.

13. An apparatus as in claim 8, wherein said selected monitoring assessments include at least one of
diagnostic information of a fault;
message information for presentation to an operator; or
remedial action to be taken in response to said selected monitoring assessments.

14. An apparatus as in claim 8, wherein said steps of receiving monitoring data include steps of receiving selected monitoring data having a new data format.

15. A method including steps of:
receiving monitoring data, wherein said monitoring data is received from and pertains to at least one of the following: (i) a file server; or (ii) a software element in a computer system;
generating indicator bits, wherein each of said indicator bits is responsive to data in said monitoring data that falls outside a limit;
collecting said indicator bits in a bit vector comparator,
in response to said indicator bits, adaptively and dynamically building a database of known combinations of said monitoring data, wherein said database is coupled to a bit vector comparator;

in response to said monitoring data, adaptively and dynamically building a database of associations between said known combinations and selected monitoring assessments; and taking action in response to said selected monitoring assessments.

16. A method as in claim 15, wherein said database includes a non-null initial set of said known combinations.

17. A method as in claim 15, wherein said database includes a null initial set of said known combinations.

18. A method as in claim 15, wherein said database includes at least one said known combination associated with a non-fault monitoring assessment.

19. A method as in claim 15, wherein said monitoring data includes SNMP data or email text.

20. A method as in claim 15, wherein said selected monitoring assessments include at least one of diagnostic information of a fault;

message information for presentation to an operator; or remedial action to be taken in response to said selected monitoring assessments.

21. A method as in claim 15, wherein said instructions of receiving monitoring data include instructions of receiving selected monitoring data having a new data format.

* * * * *